(12) United States Patent
Ermolov et al.

(10) Patent No.: US 7,852,582 B2
(45) Date of Patent: Dec. 14, 2010

(54) METHOD FOR DETERMINING WEAR OF A DATA STORAGE MEDIUM AND DATA STORAGE DEVICE

(75) Inventors: Vladimir Ermolov, Espoo (FI); Sergey Boldyrev, Helsinki (FI)

(73) Assignee: Nokia Corporation, Espoo (FI)

( * ) Notice: Subject to any disclaimer, the term of this patent is extended or adjusted under 35 U.S.C. 154(b) by 339 days.

(21) Appl. No.: 11/944,250

(22) Filed: Nov. 21, 2007

(65) Prior Publication Data

US 2009/0128942 A1    May 21, 2009

(51) Int. Cl.
*G11B 27/36* (2006.01)
(52) U.S. Cl. ...................................................... 360/31
(58) Field of Classification Search ............... 360/78.04, 360/69, 55, 53, 31
See application file for complete search history.

(56) References Cited

U.S. PATENT DOCUMENTS

| | | | |
|---|---|---|---|
| 4,186,822 A * | 2/1980 | Khuntia et al. | 188/1.11 W |
| 6,850,443 B2 | 2/2005 | Lofgren et al. | |
| 2003/0218960 A1 | 11/2003 | Albrecht et al. | |
| 2004/0047275 A1 | 3/2004 | Cherubini et al. | |
| 2007/0294490 A1* | 12/2007 | Freitas et al. | 711/154 |

OTHER PUBLICATIONS

E. Eleftheriou et al., Millipede—MEMS-based Scanning-Probe Data Storage System, IEEE Transactons on Magnetics, Mar. 2003, pp. 938-945, vol. 39, No. 2.

* cited by examiner

*Primary Examiner*—Fred Tzeng
(74) *Attorney, Agent, or Firm*—Harrington & Smith

(57) ABSTRACT

The invention relates to a method of determining wear of a data storage medium actively by performing a read operation on the data storage medium and detecting a read signal, comparing the read signal to at least one wear threshold; and determining a wear level of an area of the data storage medium based on the comparison. The wear threshold is lower than a detection threshold, wherein the detection of the read signal above the detection threshold indicates the presence of stored data.

25 Claims, 4 Drawing Sheets

METHOD FOR DETERMINING WEAR OF A DATA STORAGE MEDIUM AND DATA STORAGE DEVICE

FIELD OF THE INVENTION

The present invention relates to a method and apparatus for determining wear of a data storage medium, particularly a probe data storage medium which stores data in the form of marks or indentations on a surface, and a data storage device implementing the method.

BACKGROUND TO THE INVENTION

There is an increasing requirement in data and multimedia services for more and more local memory in hand-held or mobile devices. Presently, flash memories are the memory type typically used in mobile terminals such as mobile telecommunications devices. As data requirements increase, progress has been made to increase the capacity and decrease the cost of flash memories. However, there is still a need for a data storage medium having low cost, high storage density and high access speed.

Recently, probe storage systems have been developed. Probe storage utilises atomic force microscopy probes having tips which are heated so that when they make contact with a polymer surface of a recording medium, the heated tip softens the polymer surface and creates an indentation or "pit" in the polymer surface.

The probes are used for reading by exploiting the temperature dependent resistance of the probes. The probes are heated to a temperature lower than that required to melt the polymer. When the probe travels into a pit the heat transfer between the polymer and the probe is more efficient and the probe's temperature and hence resistance will decrease. The decrease in resistance is detected to detect the presence of the pit.

More recently developed probe storage devices, such as those shown in "Millipede—A MEMS-Based Scanning-Probe Data-Storage System" by E. Eleftheriou et al, IEEE Transactions on Magnetics Vol. 39, No. 2, March 2003; US 2003/0218960 or US 2004/0047275 use a storage medium and a probe array, wherein either the storage medium or the probe array is scanned in x-y scanning directions. For example, the storage medium may be spring-mounted and can be pulled in the x and y direction by actuators on each edge. The storage medium moves below a two-dimensional array of fixed read/write probes. To access data, the medium is first pulled to a specified location. In addition, a feedback controlled z approaching scheme brings the probe array into contact with the storage medium. This contact is maintained and controlled while x-y scanning is performed for read/write. The array of probes, which may comprise thousands of probes, work simultaneously and each probe writes and reads information in its defined area. The probes thus scan their associated fields of the storage medium in parallel so that high data rates can be achieved. Already, such probe storage prototypes are demonstrating storage density as high as 3 Tb/inch$^2$.

To erase the indentations, the "pile-up" phenomenon is exploited. When bits are written, raised rings of displaced polymer are formed around the indentations. To erase a bit, the probe is positioned in the vicinity of the indentation and injected with sufficient current to cause melting of the polymer. Thus, the previously existing indentation is filled with melted polymer.

However, over time with multiple cycles of writing and erasing, the surface roughness of the polymer increases. The probe tips also become worn and lose sharpness, and this is made worse by increasing surface roughness. Ambient conditions such as humidity can further increase wear of the probe tips. All these effects mean that probe storage devices are extremely sensitive to the number of reading, writing and erasing cycles.

U.S. Pat. No. 6,850,443 discloses a wear levelling algorithm for use with flash memory devices. This is based on counting of the number of times each portion of the device is written and erased, and distributing use so that portions of the device do not become over-used and likely to become unusable before others.

However, probe storage devices are even more sensitive to wear and so a more sophisticated method of determining wear is required.

SUMMARY OF THE INVENTION

The present invention provides a method of determining wear of a data storage medium, comprising:

performing a read operation on the data storage medium comprising detecting a read signal;

comparing the read signal to at least one wear threshold; and determining a wear level of an area of the data storage medium based on the comparison;

wherein the wear threshold is lower than a detection threshold, wherein the detection of the read signal above the detection threshold indicates the presence of stored data.

The present invention also provides a data storage device comprising:

a data storage medium; and a controller for controlling writing of data to the data storage medium, wherein the controller is configured to:

detect a read signal resulting from performing a read operation on the data storage medium;

compare the read signal to at least one wear threshold; and determine a wear level of an area of the data storage medium based on the comparison;

wherein the wear threshold is lower than a detection threshold, wherein the detection of the read signal above the detection threshold indicates the presence of stored data.

The present invention also provides a computer readable medium having stored thereon computer readable processing instructions comprising:

instructions for performing a read operation on a data storage medium comprising detecting a read signal;

instructions for comparing the read signal to at least one wear threshold; and instructions for determining a wear level of an area of the data storage medium based on the comparison;

wherein the wear threshold is lower than a detection threshold, wherein the detection of the read signal above the detection threshold indicates the presence of stored data.

In one embodiment, the read signal is also compared to the detection threshold, and the wear level is determined based only on portions of the read signal below the detection threshold. This excludes the peaks corresponding to data marks from the wear analysis.

The read signal may be compared to a plurality of different wear thresholds, each being lower than the detection threshold. The wear level may be determined depending on the number of portions of the read signal which exceed the or each wear threshold in the area.

The determined wear level information may be stored on the data storage medium. Alternatively, the wear level information may be stored in a memory of the controller.

In one embodiment the data storage medium stores data in the form of indentations on a surface, wherein the read signal detects a roughness of the surface. In particular, the data storage medium may be a probe storage medium having a polymer surface into which indentations are formed thermo-mechanically. The data storage device may further comprise a probe array for writing data to the data storage medium and actuators configured to move the data storage medium with respect to the probe array.

The present invention also provides a method of controlling writing to a data storage medium comprising:

performing a read operation on the data storage medium comprising detecting a read signal;

comparing the read signal to at least one wear threshold, wherein the wear threshold is lower than a detection threshold, wherein the detection of the read signal above the detection threshold indicates the presence of stored data;

determining a wear level of an area of the data storage medium based on the comparison; and controlling a write operation based on the wear level determination.

The method may comprise controlling the write operation to write new data to areas having low wear levels relative to the wear levels of the rest of the surface. The write operation may be controlled to avoid writing new data to areas having high wear levels relative to the wear levels of the rest of the surface.

BRIEF DESCRIPTION OF THE DRAWINGS

Embodiments of the present invention will now be described in detail with reference to accompanying drawings, in which.

DETAILED DESCRIPTION

Figure 1:
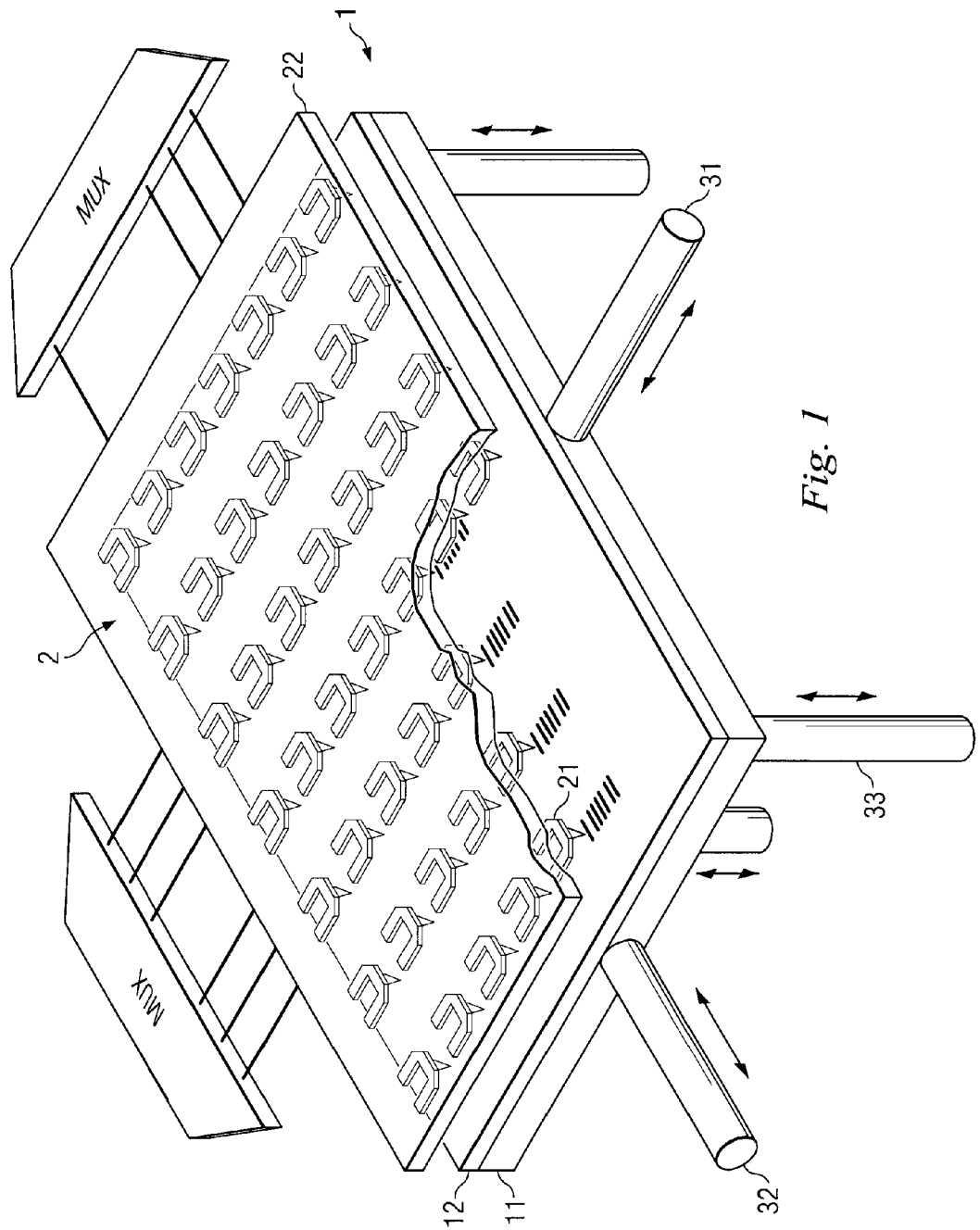
FIG. 1 is a perspective view of a storage device in accordance with the present invention.

FIG. 1 is a perspective view of a storage device including a storage medium 1 according to the present invention. The storage device includes the storage medium 1 and a probe array 2 comprising a plurality of probes 21 arranged in a two-dimensional array and mounted on a support 22. The storage medium 1 comprises a substrate 11 and a polymer layer 12 forming a recording surface of the storage medium 1. The storage medium 1 is mounted such that it is movable in the x, y and z directions when a force is applied by actuators 31, 32 and 33 respectively.

Figure 2:
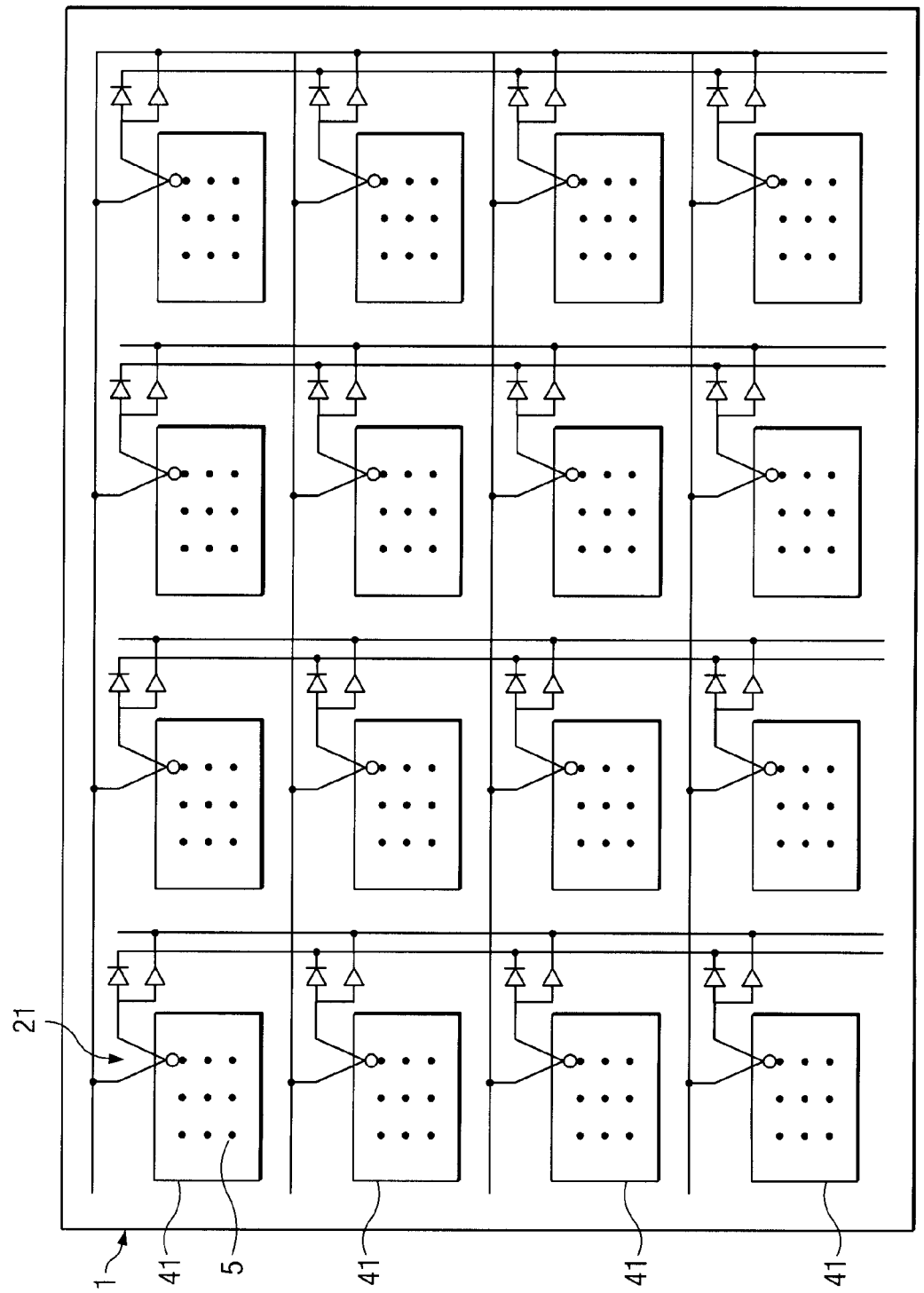
FIG. 2 is a top view of a storage medium in accordance with the present invention with an illustrative probe array.

FIG. 2 is a top view illustrating schematically the probe array 2 and the surface of the storage medium 1. As the probe array 2 scans in the x and y direction, each probe 21 scans an associated data field 41. Each probe 21 exclusively scans its own associated data field 41 such that all of the data fields 41 can be scanned simultaneously in parallel.

Figure 3:
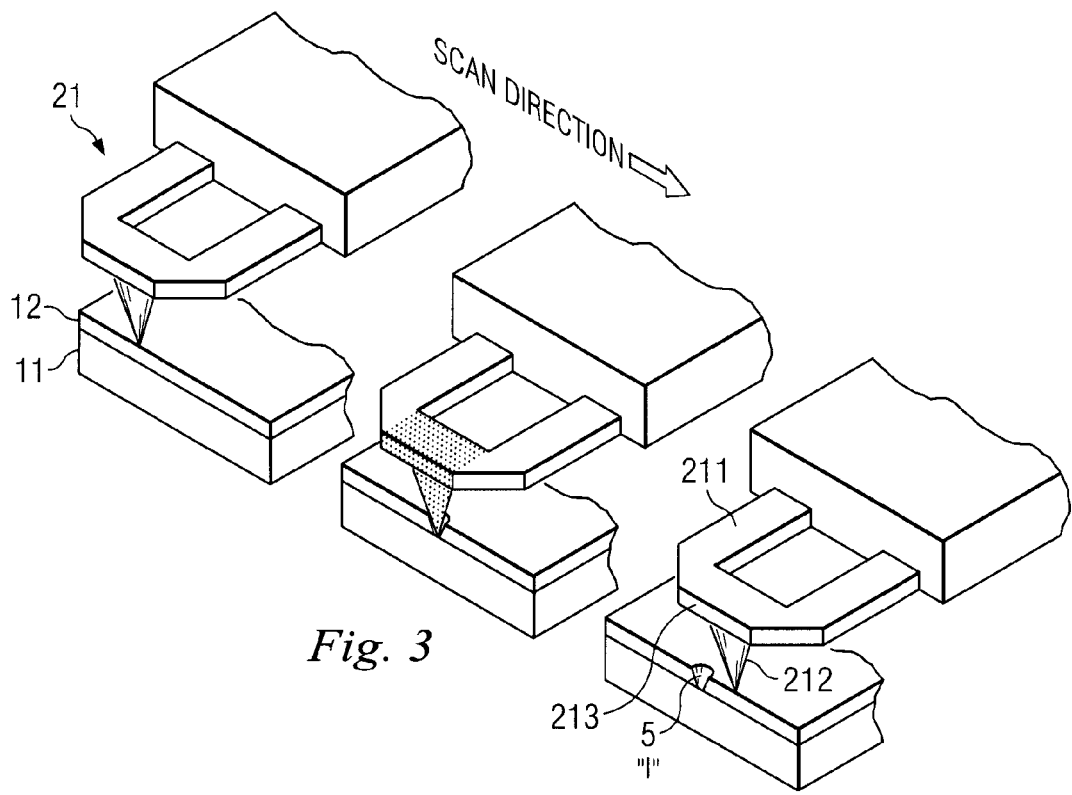
FIG. 3 illustrates writing of data by a probe.

FIG. 3 illustrates the thermo-mechanical writing of data by each probe 21. Each probe 21 comprises a spring cantilever 211 and a heater platform 213 mounted between the legs of spring cantilever 211. The heater platform 213 has a tip 212 mounted thereon. As the probe array 2 is moved by actuator 33 in the z direction and the probe tip 212 comes in contact with the surface of the storage medium 1, a force is applied by the spring cantilever 211. The probe 21 is scanned in the x direction by moving the storage medium in the x direction by actuator 31. Writing of a mark or pit 5 is achieved by applying a current or voltage pulse to the heater platform 213. The cantilever legs are made highly conducting by high-dose ion implantation, whereas the heater platform 213 remains low-dose. Therefore, current passing through the cantilever 211 heats the tip 212 to a temperature (approximately 400° C.) sufficient to melt polymer layer 12 and form a mark 5 in the polymer layer, the mark having a conical shape corresponding to the shape of the tip 212. Once melting has commenced, the tip 212 is pressed into the polymer by electrostatic force, which increases the heat transfer to the polymer, increases the volume of melted polymer and increases the bit size. Optimal bit size can be achieved by optimisation of load force and temperature.

Figure 4:
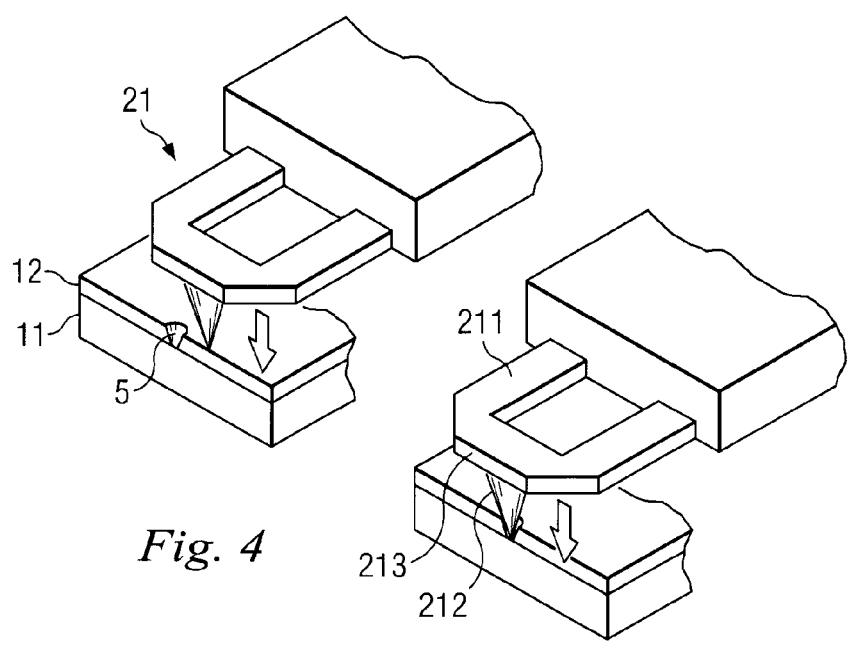
FIG. 4 illustrates reading of data by a probe.

FIG. 4 illustrates the reading of data from the storage medium 1. A sensing current is passed through the probe 21 to heat the heater platform 213 and hence the tip 212. The sensing current is such that the temperature to which the heater platform 213 and the tip 212 are heated is less than the temperature used for writing and specifically less than the temperature required to melt the polymer layer 12. As the tip 212 enters a mark 5, because of the conical surface of the tip 212 and the matching conical surface of the mark 5 there is an increased surface area of the tip 212 in contact with the polymer layer 12, which results in more heat transfer to the substrate and a drop in temperature of the tip 212 and heater platform 213. This causes a detectable drop in resistance and increase in current flow, allowing the detection of the mark 5. In order to conserve power, a pulsed sensing current may be used such that the pulses only occur when the probe 21 is located at the position of a mark (or, if no mark is present, where a mark would be recorded), or in the vicinity of the mark. The pulses may be oversampled to help determine the exact position of the centre of the mark. The oversampling may be selectively applied to only some of the probes 21 as required, to conserve energy.

In both FIGS. 3 and 4, the cantilever 211 is illustratively shown as perpendicular to the scan direction, whereas actually the cantilever 211 is directed in the longitudinal direction ie parallel to the scan direction.

To erase a mark 5, the probe 21 is positioned adjacent to the mark 5 and a current is passed through the cantilever 211 to heat the tip 212 to a temperature sufficient to melt the polymer layer 12. The displaced melted polymer fills the mark 5 thus erasing it. However, this leaves the surface with a surface roughness comprising indentations which are not deep enough to be detected as a mark during reading, but which will cause peaks in a read signal 7.

Figure 5:
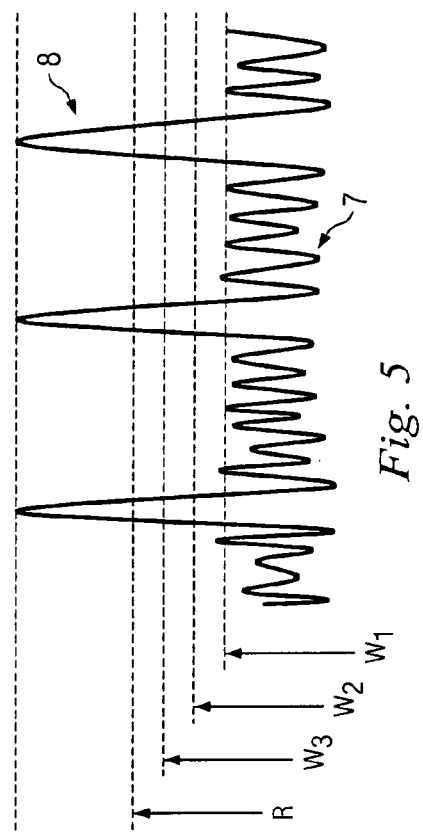
FIG. 5 illustrates a read signal.

FIG. 5 illustrates the variation of a read signal 7 during scanning of the storage medium 1 by probe 21. The read signal 7 is related to the current flow in the probe 21 and therefore peaks 8 in the read signal 7 correspond to indentations in the surface of the polymer layer 12. Marks 5 cause peaks 8 higher than a read threshold R, but smaller indentations caused by the erasing of marks cause lower peaks, which increase in amplitude and become more numerous with increased number of write/erase cycles.

As mentioned above, the reading mode can use a continuous sensing mode, an oversampled pulsed sensing mode or a pulsed sensing mode wherein pulses only occur in the region of data marks 5. Wear analysis can take place using all three modes, during a normal reading operation. However, in the pulsed mode or oversampled mode less of the surface is sampled (but power consumption will be reduced). Therefore, the device may be capable of switching between the modes depending on the requirements of power consumption, and surface sampling. For example, if the sensing current in the reading mode is a pulsed sensing current wherein pulses only occur in the region of data marks 5, then the device may switch to either a continuous mode or an oversampled pulsed mode for wear analysis if improved sampling of the surface is required.

Figure 6:
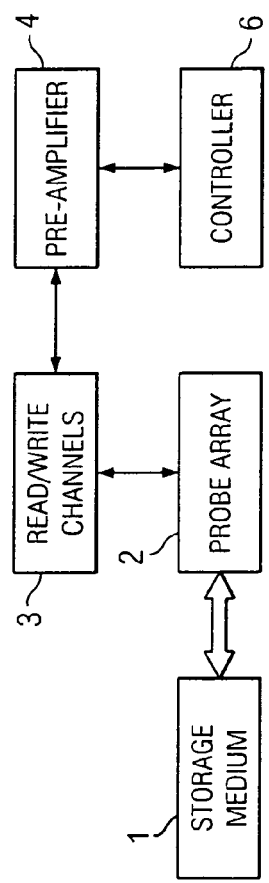
FIG. 6 illustrates a data storage device in accordance with an embodiment of the invention.

FIG. 6 illustrates a data storage device including a controller 6 for controlling writing by probe array 2 onto the storage medium 1 and reading by the probe array 2 from the storage medium 1. During a read operation, the controller 6 causes a read current to be applied to the probe array 2. The read signal 7 is detected by the read channel of read/write channels 3 and processed by pre-amplifier 4 then passed to controller 6. The controller 6 compares the read signal 7 with the read threshold R and detects the presence of a mark 5 when the read signal 7 exceeds the read threshold R.

However, the surface roughness caused by the erasure of data (which is a measure of the wear level of the data storage medium) causes additional variations of the read signal 7 which are lower than the read threshold R. Therefore, the controller 6 further compares the read signal 7 with a plurality of different wear thresholds $W_1$, $W_2$, $W_3$, having first excluded the portions of the signal which exceed the read threshold R and thus correspond to detection of marks 5. The wear level of a portion of the storage medium 1 can be determined by detecting the number of times the read signal 7 exceeds the different wear thresholds $W_1$, $W_2$, $W_3$.

By determining wear level of different portions of the surface of the data storage medium 1, the controller 6 can determine the relative wear across the entire surface of the storage medium 1. The controller 6 can thus use this information to control writing of the data to ensure new data is written to areas of the storage medium having low wear levels relative to the rest of the storage medium, and the controller 6 can avoid writing of data to areas showing high levels of wear. Thus, the present invention achieves wear levelling across the surface of the storage medium.

The controller 6 obtains the wear level information during a normal reading operation and may store this information to the storage medium 1 for use in a future writing operation. Alternatively, the wear level information may be stored in a memory of the controller 6, which also stores various tuning parameters of the data storage medium 1. In the data storage device of the present invention, a pre-amplifier 4 is used to process the signal from the read/write channel unit 3 before it is analysed by the controller 6.

The data can be analysed by any known wear levelling algorithm to control writing of the data. The calibration process may be used to determine the different thresholds $W_1$, $W_2$, $W_3$.

Figure 7:
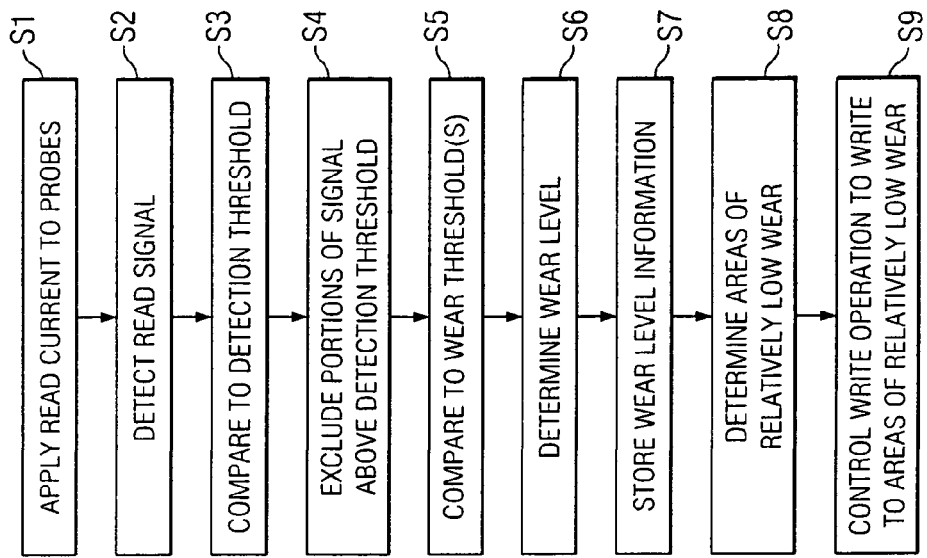
FIG. 7 is a flow chart illustrating an embodiment of the method.

FIG. 7 illustrates an embodiment of the method of the present invention. In step S1, a read current is applied to the probe array 2. As mentioned above, this may be a pulsed current and may be applied selectively to only some of the probes 21. In step S2, the read signal 7 corresponding to a current in the probe 21 is detected by the controller 6. In step S3, the read signal 7 is compared to the detection threshold R, to detect the data marks 5 and in step S4, the portions of the signal above the read threshold (and therefore which correspond to the data marks 5) are excluded from the wear determination. In step S5, the rest of the signal is compared to the wear threshold(s). One wear threshold may be used or a plurality of wear thresholds $W_1$, $W_2$, $W_3$ at different levels may be used. At step S6, wear levels across the data storage medium 1 are determined, based on the number of times the read signal 7 exceeds the wear threshold (s) and the magnitude of the wear threshold $W_1$, $W_2$, $W_3$ which is exceeded. This wear level information is stored, either to the data storage medium 1, or in a memory of the controller 6, in step S7. In step S8, the controller determines areas of the data storage medium 1 having low wear levels relative to the rest of the storage medium 1, and in step S9, a write operation is controlled so that new data is written to areas having relatively low wear and which are free of data or which the controller 6 has been instructed to erase and rewrite.

The present invention provides an active approach to wear levelling, rather than prior art passive approaches used with flash memory drives which merely rely on counting the number of read/write/erase cycles. On the contrary, the present invention actively provides a measure of the wear level on the surface. A single wear threshold may be used, or multiple wear thresholds may be used for a more sophisticated measurement of wear level.

The invention may also be applied to other types of storage media, such as ferro-electric, phase change etc. The present invention may also be embodied as computer readable instructions stored on a storage device, wherein the instructions can be read by the controller 6 to cause the controller 6 to carry out the method.

The data storage device of the invention may also be included in an integrated circuit, and may be included in a handheld device such as a portable telecommunications device.

It should be realised that the foregoing examples should not be construed as limiting. Other variations and modifications will be apparent to persons skilled in the art upon reading the present application. Such variations and modifications extend to features already known in the field, which are suitable for replacing the features described herein, and all functionally equivalent features thereof. Moreover, the disclosure of the present application should be understood to include any novel features or any novel combination of features either explicitly or implicitly disclosed herein or any generalisation thereof and during the prosecution of the present application or of any application derived therefrom, new claims may be formulated to cover any such features and/or combination of such features.

What is claimed is:

1. A method comprising:
performing a read operation for determining the presence of stored data on an area of a data storage medium comprising detecting a read signal;
comparing the read signal to at least one wear threshold; and
determining a wear level of the area of the data storage medium based on the comparison;
wherein the wear threshold is lower than a detection threshold, wherein the detection of the read signal above the detection threshold indicates the presence of stored data.

2. A method according to claim 1, further comprising comparing the read signal to the detection threshold.

3. A method according to claim 2, comprising determining the wear level based only on portions of the read signal below the detection threshold.

4. A method according to claim 1, comprising comparing the read signal to a plurality of different wear thresholds, each being lower than the detection threshold.

5. A method according to claim 1, wherein the wear level is determined depending on the number of portions of the read signal which exceed the or each wear threshold in the area.

6. A method according to claim 1, further comprising storing the determined wear level information on the data storage medium.

7. A method according to claim 1, wherein the data storage medium stores data in the form of indentations on a surface, wherein the read signal detects a roughness of the surface.

8. A method according to claim 7, wherein the data storage medium is a probe storage medium having a polymer surface into which indentations are formed the thermomechanically.

9. A method comprising:
 performing a read operation for determining the presence of stored data on an area of data storage medium comprising detecting a read signal;
 comparing the read signal to at least one wear threshold, wherein the wear threshold is lower than a detection threshold, wherein the detection of the read signal above the detection threshold indicates the presence of stored data;
 determining a wear level of the area of the data storage medium based on the comparison; and
 controlling a write operation based on the wear level determination.

10. A method according to claim 9, further comprising controlling the write operation to write new data to areas having low wear levels relative to the wear levels of the rest of the surface.

11. A method according to claim 9, further comprising controlling the write operation to avoid writing new data to areas having high wear levels relative to the wear levels of the rest of the surface.

12. A device comprising:
 a data storage medium; and
 a controller for controlling writing of data to the data storage medium,
 wherein the controller is configured to
 detect a read signal resulting from performing a read operation for determining the presence of stored data on an area of the data storage medium;
 compare the read signal to at least one wear threshold; and
 determine a wear level of the area of the data storage medium based on the comparison;
 wherein the wear threshold is lower than a detection threshold, wherein the detection of the read signal above the detection threshold indicates the presence of stored data.

13. A data device according to claim 12, wherein the controller is configured to compare the read signal to the detection threshold and determine the wear based only on portions of the read signal below the detection threshold.

14. A device according to claim 12, wherein the controller is configured to compare the read signal to a plurality of different wear thresholds, each being lower than the detection threshold.

15. A device according to claim 12, wherein the controller is configured to determine the wear level depending on the number of portions of the read signal which exceed each of the at least one wear thresholds in the area.

16. A device according to claim 12, wherein the data storage medium comprises a surface having data stored thereon in the form of indentations on the surface, wherein the read signal is a measure of a roughness of the surface.

17. A device according to claim 16, wherein the data storage medium is a probe storage medium having a polymer surface into which indentations are formed thermomechanically.

18. A device according to claim 17, further comprising a probe array for writing data to the data storage medium.

19. A device according to claim 18, further comprising actuators configured to move the data storage medium with respect to the probe array.

20. A device according to claim 12, wherein the controller is configured to control a write operation based on the wear level determination.

21. A device according to claim 20, wherein the controller is configured to control the write operation to write new data to areas having low wear levels relative to the wear levels of the rest of the surface.

22. A device according to claim 20, wherein the controller is configured to control the write operation to avoid writing new data to areas having high wear levels relative to the wear levels of the rest of the surface.

23. An integrated circuit comprising a device according to claim 12.

24. A handheld device including a device according to claim 12.

25. A computer readable medium having stored thereon computer readable processing instructions comprising:
 instructions for performing a read operation for determining the presence of stored data on an area of a data storage medium comprising detecting a read signal;
 instructions for comparing the read signal to at least one wear threshold; and
 instructions for determining a wear level of the area of the data storage medium based on the comparison;
 wherein the wear threshold is lower than a detection threshold, wherein the detection of the read signal above the detection threshold indicates the presence of stored data.

* * * * *

UNITED STATES PATENT AND TRADEMARK OFFICE
CERTIFICATE OF CORRECTION

| | | |
|---|---|---|
| PATENT NO. | : 7,852,582 B2 | |
| APPLICATION NO. | : 11/944250 | |
| DATED | : December 14, 2010 | |
| INVENTOR(S) | : Ermolov et al. | |

It is certified that error appears in the above-identified patent and that said Letters Patent is hereby corrected as shown below:

Claim 8, col. 7, line 15 delete "the" in between formed and thermomechanically.

Claim 9, col. 7, line 18 insert --a-- in between of and data.

Signed and Sealed this
First Day of February, 2011

David J. Kappos
*Director of the United States Patent and Trademark Office*